June 9, 1925. 1,541,736
H. C. OVERIN
SHAFT FOR POLO MALLETS AND THE LIKE
Filed Sept. 8, 1923
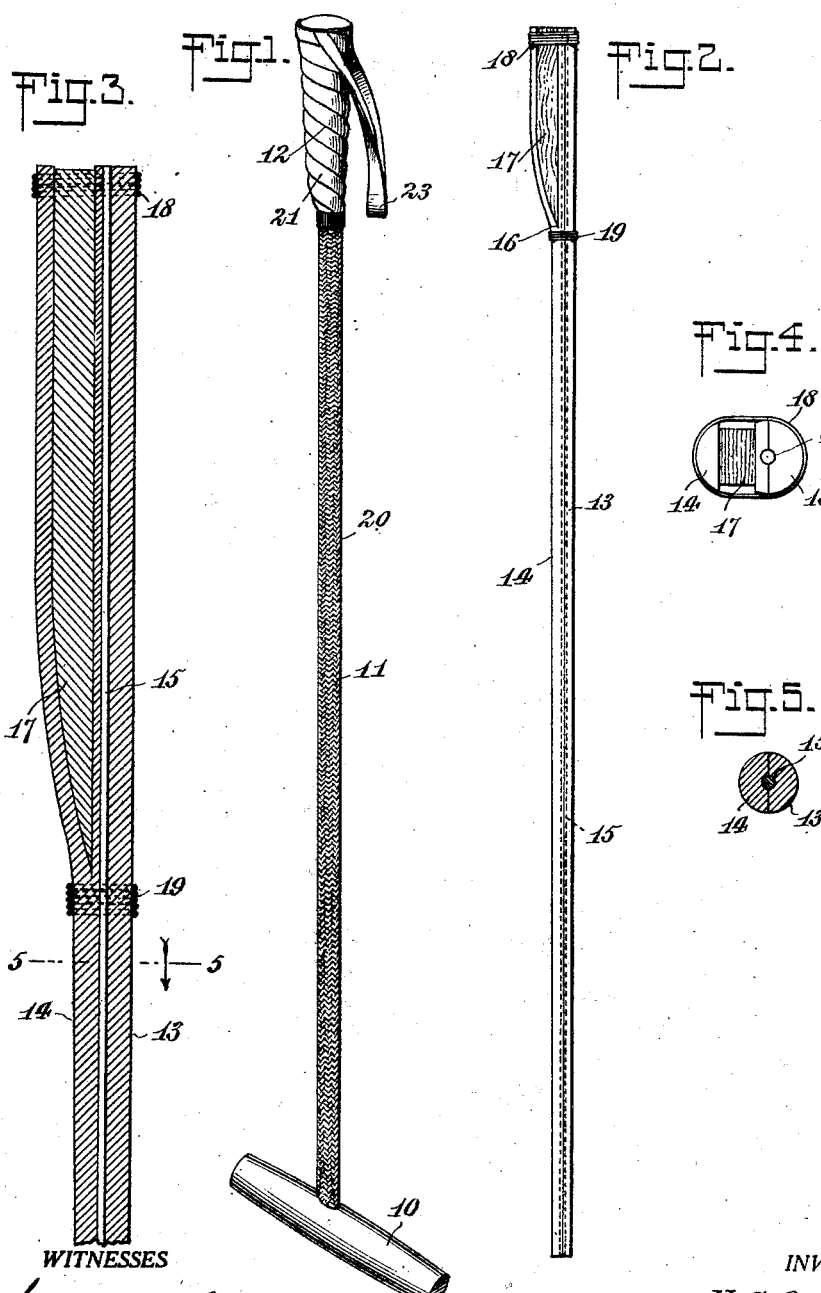
WITNESSES
INVENTOR
H. C. Overin.
BY
ATTORNEYS Patented June 9, 1925.

1,541,736

UNITED STATES PATENT OFFICE.

HENRY C. OVERIN, OF WEEHAWKEN, NEW JERSEY.

SHAFT FOR POLO MALLETS AND THE LIKE.

Application filed September 8, 1923. Serial No. 661,611.

*To all whom it may concern:*

Be it known that I, HENRY C. OVERIN, a citizen of the United States, and a resident of Weehawken, in the county of Hudson and State of New Jersey, have invented a new and Improved Shaft for Polo Mallets and the like, of which the following is a full, clear, and exact description.

The present invention relates to new and useful improvements in shafts for bats and the like, and it pertains more particularly to shafts for polo mallets.

It is one of the objects of the invention to provide a polo mallet shaft which possesses the proper resiliency or "whip".

It is a further object of the invention to provide a new and improved form of grip for shafts of this type.

It is a still further object of the invention to construct a shaft of this type in such a manner that it is possessed of considerable strength.

With the above and other objects in view, reference is had to the accompanying drawings, in which—

Figure 1 is a view in elevation of a polo mallet equipped with a shaft and grip constructed in accordance with the present invention;

Fig. 2 is a view of the shaft and grip in its partially completed state;

Fig. 3 is an enlarged view thereof;

Fig. 4 is an enlarged view of the shaft;

Fig. 5 is a detail sectional view taken on the line 5—5 of Fig. 3.

Referring more specifically to the drawings, the reference numeral 10 designates the mallet head, 11 designates the shaft, and 12 designates the grip.

As more clearly shown in Fig. 2, the shaft is formed from rattan or other suitable material and is split longitudinally into two sections 13 and 14. After the shaft has been split longitudinally into two members, the abutting face of each member is grooved and a shaft, preferably of steel, is interposed with respect to the two members, said shaft being designated by the reference numeral 15.

The handle is formed by separating one of the members, as indicated at 16, and inserting a block of wood 17 of suitable shape, after which the block of wood is bound in position by means of bindings or whippings 18 and 19. After the foregoing steps have been carried out, the shaft is covered with a suitable braided material, as shown at 20 in Fig. 1, to give a finish thereto. The hand grip 12 is formed by wrapping cord or other suitable material around the upper end of the shaft and handle thus formed, as shown at 21 in Fig. 2, and a suitable wrist loop 23 is attached.

From the foregoing it is apparent that the present invention provides a new and improved method of forming bat shafts and hand grips therefor, and that the improved construction provides a shaft which possesses a greater amount of strength than shafts formed in the ordinary manner and also possesses the required amount of "whip" to make the shaft practical for use.

What is claimed is:

1. A shaft for polo mallets and the like, comprising two members secured together and having a metallic rod interposed between them, a block inserted in one member at the handle end thereof, whereby an enlargement on one side of the handle end will be formed, a wrapping about said handle end, and braiding applied to the shaft.

2. A shaft for polo mallets and the like, comprising a member, a stiffening core in said member, and a block inserted in the handle end of the member at one side of its longitudinal center and forming an enlargement on one side of the handle end, and a wrapping about said handle end.

HENRY C. OVERIN.